US012694659B2

(12) United States Patent (10) Patent No.: US 12,694,659 B2
Natroshvili et al. (45) Date of Patent: Jul. 28, 2026

(54) DEPTH AND MOTION ESTIMATIONS IN MACHINE LEARNING ENVIRONMENTS

(71) Applicant: Intel Corporation, Santa Clara, CA (US)

(72) Inventors: Koba Natroshvili, Wadlbronn (DE); Kay-Ulrich Scholl, Malsch (DE)

(73) Assignee: Intel Corporation, Santa Clara, CA (US)

( * ) Notice: Subject to any disclaimer, the term of this patent is extended or adjusted under 35 U.S.C. 154(b) by 209 days.

(21) Appl. No.: 18/466,216

(22) Filed: Sep. 13, 2023

(65) Prior Publication Data

US 2024/0013526 A1 Jan. 11, 2024

Related U.S. Application Data

(63) Continuation of application No. 17/330,906, filed on May 26, 2021, now Pat. No. 11,798,271, which is a
(Continued)

(51) Int. Cl.
*G06T 7/50* (2017.01)
*G06F 18/2413* (2023.01)
(Continued)

(52) U.S. Cl.
CPC .......... *G06V 10/82* (2022.01); *G06F 18/2413* (2023.01); *G06F 18/25* (2023.01); *G06N 3/0442* (2023.01); *G06N 3/048* (2023.01); *G06N 3/084* (2013.01); *G06T 7/251* (2017.01); *G06T 7/50* (2017.01); *G06V 10/454* (2022.01); *G06V 10/764* (2022.01); *G06V 10/80* (2022.01); *G06T 2207/20084* (2013.01)

(58) Field of Classification Search
CPC . G06T 7/251; G06T 7/50; G06T 2207/20084; G06T 2207/10016; G06T 2207/10024; G06T 2207/20081; G06T 7/269; G06T 7/579; G06F 18/2413; G06F 18/25; G06N 3/044; G06N 3/045; G06N 3/048; G06N 3/084; G06V 10/454; G06V 10/80; G06V 10/82; G06V 10/764
USPC ........................................................ 382/107
See application file for complete search history.

(56) References Cited

U.S. PATENT DOCUMENTS 9,495,764 B1 * 11/2016 Boardman ............. G06V 20/64
2004/0193313 A1 9/2004 Cornet
(Continued)

OTHER PUBLICATIONS

Casser et al., "Depth Prediction Without the Sensors: Leveraging Structure for Unsupervised Learning from Monocular Videos," arXiv:1811.06152v1 [cs.CV], Nov. 15, 2018, 8 pages.

*Primary Examiner* — Ali Bayat
(74) *Attorney, Agent, or Firm* — Hanley, Flight & Zimmerman, LLC

(57) ABSTRACT

A mechanism is described for facilitating depth and motion estimation in machine learning environments, according to one embodiment. A method of embodiments, as described herein, includes receiving a frame associated with a scene captured by one or more cameras of a computing device; processing the frame using a deep recurrent neural network architecture, wherein processing includes simultaneously predicating values associated with multiple loss functions corresponding to the frame; and estimating depth and motion based the predicted values.

15 Claims, 14 Drawing Sheets

Related U.S. Application Data continuation of application No. 16/215,348, filed on Dec. 10, 2018, now Pat. No. 11,024,041.

(51) Int. Cl.

| | |
|---|---|
| *G06F 18/25* | (2023.01) |
| *G06N 3/0442* | (2023.01) |
| *G06N 3/048* | (2023.01) |
| *G06N 3/084* | (2023.01) |
| *G06T 7/246* | (2017.01) |
| *G06V 10/44* | (2022.01) |
| *G06V 10/764* | (2022.01) |
| *G06V 10/80* | (2022.01) |
| *G06V 10/82* | (2022.01) |

(56) References Cited

U.S. PATENT DOCUMENTS

| | | | |
|---|---|---|---|
| 2005/0207491 | A1 | 9/2005 | Zhang |
| 2012/0189064 | A1 | 7/2012 | Kossentini |
| 2016/0057437 | A1 | 2/2016 | Jeong |
| 2017/0177937 | A1* | 6/2017 | Harmsen ............... G05D 1/106 |
| 2017/0195685 | A1 | 7/2017 | Chen |
| 2018/0032871 | A1* | 2/2018 | Holt ..................... G06N 3/0895 |
| 2018/0137633 | A1 | 5/2018 | Chang |
| 2018/0218198 | A1* | 8/2018 | Hushchyn ............ G06V 40/166 |
| 2018/0300927 | A1* | 10/2018 | Hushchyn ............ G06V 40/167 |
| 2018/0302629 | A1* | 10/2018 | Kondo ................... H04N 19/11 |
| 2018/0316860 | A1* | 11/2018 | Hushchyn ............ H04N 23/683 |
| 2019/0045194 | A1 | 2/2019 | Zavesky |
| 2019/0057509 | A1* | 2/2019 | Lv ......................... G06N 3/045 |
| 2020/0084427 | A1 | 3/2020 | Sun |
| 2021/0398353 | A1 | 12/2021 | Luo |

* cited by examiner

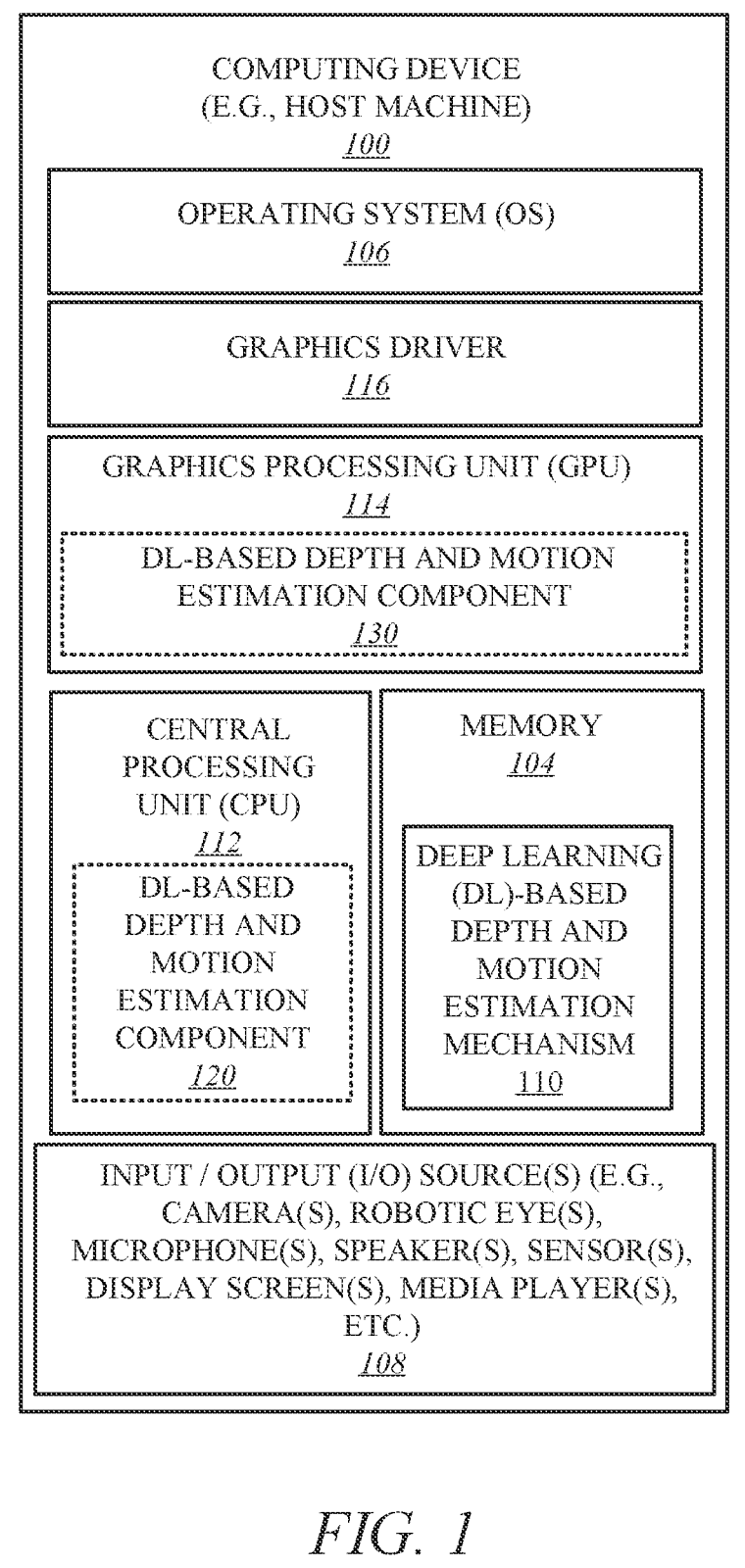

COMPUTING DEVICE
(E.G., HOST MACHINE)
*100*

OPERATING SYSTEM (OS)
*106*

GRAPHICS DRIVER
*116*

GRAPHICS PROCESSING UNIT (GPU)
*114*

DL-BASED DEPTH AND MOTION
ESTIMATION COMPONENT
*130*

CENTRAL
PROCESSING
UNIT (CPU)
*112*

DL-BASED
DEPTH AND
MOTION
ESTIMATION
COMPONENT
*120*

MEMORY
*104*

DEEP LEARNING
(DL)-BASED
DEPTH AND
MOTION
ESTIMATION
MECHANISM
*110*

INPUT / OUTPUT (I/O) SOURCE(S) (E.G.,
CAMERA(S), ROBOTIC EYE(S),
MICROPHONE(S), SPEAKER(S), SENSOR(S),
DISPLAY SCREEN(S), MEDIA PLAYER(S),
ETC.)
*108*

*FIG. 1*

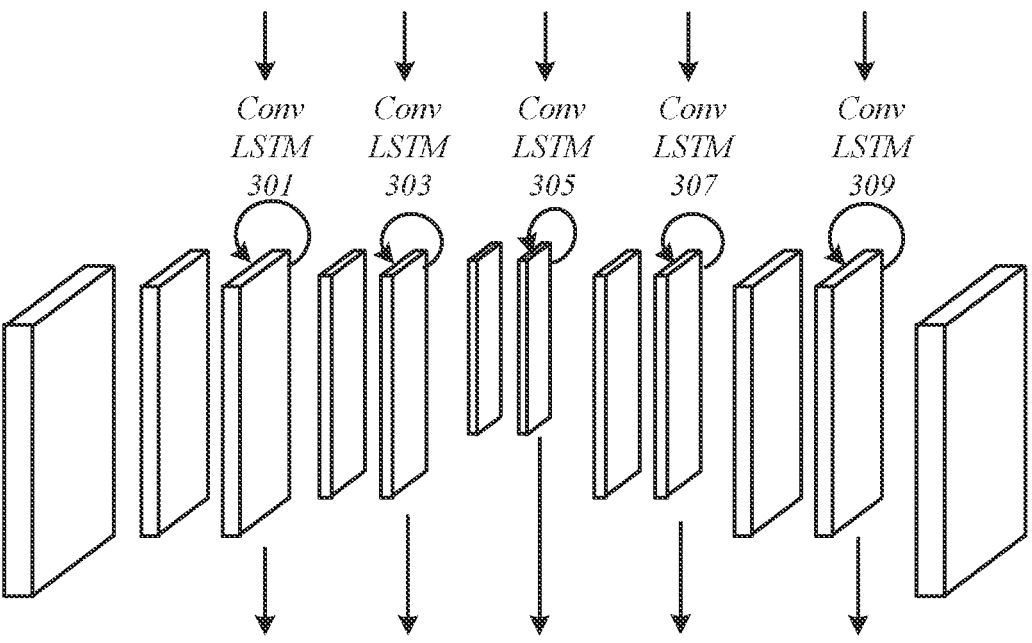
*FIG. 3A*

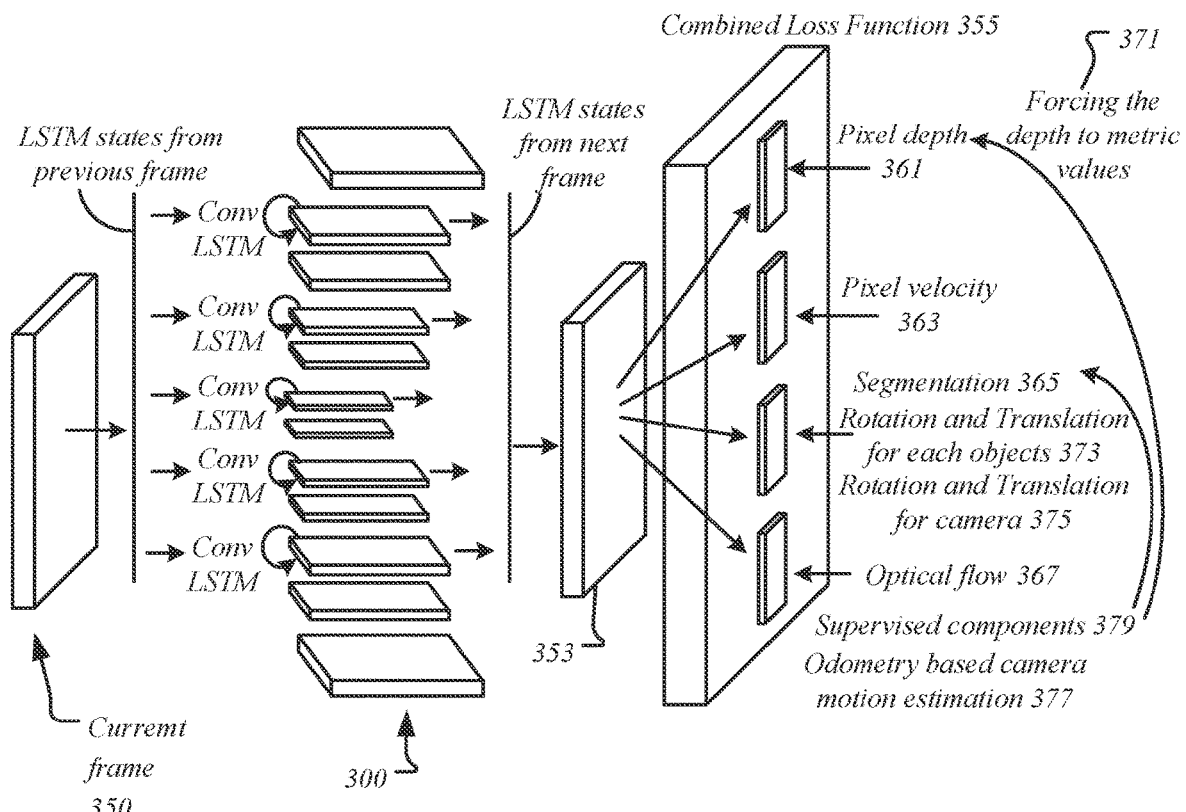
*FIG. 3B*

451

Common Layers

| Layer | I/O Channels | Scaling at output | Inputs |
|---|---|---|---|
| Conv1 | 3/32 | 2 | RGB image |
| Convlstm1 | 32/32 | 2 | Conv1 |
| ESP1 | 32/64 | 4 | Concat(Convlstm1, RGB Image) |
| Convlstm2 | 64/64 | 4 | ESP1 |
| ESP2 | 64/64 | 4 | Convlstm2 |
| ESP3 | 64/64 | 4 | ESP2 |
| ESP4 | 64/128 | 8 | Concat (ESP3, ESP1, RGB Image) |
| Convlstm3 | 128/128 | 8 | ESP4 |
| ESP5 | 128/128 | 8 | Convlstm3 |
| ESP6 | 128/128 | 8 | ESP5 |
| ESP7 | 128/128 | 8 | ESP6 |
| ESP8 | 128/128 | 8 | ESP7 |
| ESP9 | 128/128 | 8 | ESP8 |
| ESP10 | 128/128 | 8 | ESP9 |
| ESP11 | 128/128 | 8 | ESP10 |
| ESP12 | 128/128 | 8 | ESP11 |

453

Semantic Layers

| Layer | I/O Channels | Scaling at output | Inputs |
|---|---|---|---|
| Conv2 | 256/19 | 8 | Concat(ESP4, ESP12) |
| Deconv1 | 19/19 | 4 | Conv2 |
| Conv4 | 131/19 | 4 | Concat (ESP3, ESP1, RGB Image) |
| ESP13 | 38/38 | 4 | Concat (conv4, deconv1) |
| Deconv2 | 38/19 | 2 | ESP13 |
| Conv5 | 35/19 | 2 | Concat (convlstm1, RGB Image) |
| Conv3 | 38/19 | 2 | Concat (conv5, deconv2) |
| Deconv3 | 19/19 | 1 | Conv3 |
| Softmax | 19/1 | 1 | Deconv3 |

455

Depth Layers

| Layer | I/O Channels | Scaling at output | Inputs |
|---|---|---|---|
| Deconv4 | 256/32 | 4 | Concat(ESP12, ESP4) |
| Conv6 | 32/64 | 4 | Deconv4 |
| ConvLstm4 | 64/64 | 4 | Conv6 |
| Deconv5 | 64/16 | 2 | ConvLstm4 |
| Conv7 | 16/32 | 2 | Deconv5 |
| ConvLstm5 | 32/32 | 2 | Conv7 |
| Deconv6 | 32/8 | 1 | ConvLstm5 |
| Conv8 | 8/1 | 1 | Deconv6 |

*FIG. 4D*

ADJACENT SCREEN PERSPECTIVE MODULE *607*

GESTURE TO VIEW AND SCREEN SYNCH *608*

VIRTUAL OBJECT TRACKER MODULE *606*

VIRTUAL OBJECT BEHAVIOR MODULE *604*

BUS *609*

3-D IMAGE INTERACTION AND EFFECTS MODULE *605*

MOMENTUM AND INERTIA MODULE *602*

OBJECT VELOCITY AND DIRECTION MODULE *603*

COMMAND EXECUTION MODULE *601*

SCREEN RENDERING MODULE *621*

OBJECT AND GESTURE RECOGNITION MODULE *622*

DIRECTION OF ATTENTION MODULE *623*

DEVICE PROXIMITY DETECTION MODULE *625*

RGB Components       Convolutional Layers       Fully Connected Layers

DEPTH AND MOTION ESTIMATIONS IN MACHINE LEARNING ENVIRONMENTS

CLAIM TO PRIORITY

This application is a continuation of and claims the benefit of and priority to U.S. application Ser. No. 17/330,906, entitled DEPTH AND MOTION ESTIMATIONS IN MACHINE LEARNING ENVIRONMENTS, by Koba Natroshvili, et al., filed May 26, 2021, now allowed, which is a continuation of and claims the benefit of and priority to U.S. application Ser. No. 16/215,348, entitled DEPTH AND MOTION ESTIMATIONS IN MACHINE LEARNING ENVIRONMENTS, by Koba Natroshvili, et al., filed Dec. 10, 2018, now issued as U.S. Pat. No. 11,024,041, the entire contents of which are incorporated herein by reference.

FIELD

Embodiments described herein relate generally to data processing and more particularly to facilitate depth and motion estimations in machine learning environments.

BACKGROUND

Conventional techniques use structure-from-motion (SFM) algorithms to obtain camera motions and three-dimensional (3D) structures of a scene captured by cameras. Such conventional techniques are inherently unreliable since they are not capable of providing any estimation of depth without having some assumption of a model of an environment. For example, any depth involving a single camera is severely limited in that it can only be estimated up to a scaling factor.

BRIEF DESCRIPTION OF THE DRAWINGS

Embodiments are illustrated by way of example, and not by way of limitation, in the figures of the accompanying drawings in which like reference numerals refer to similar elements.

FIG. 1 illustrates a computing device employing a deep learning-based depth and motion estimation mechanism according to one embodiment.

FIG. 3A illustrates a convolutional long short-term memory architecture according to one embodiment.

FIG. 3B illustrates a deep recurring neural network architecture according to one embodiment.

FIG. 4D illustrates multiple tables associated with fusion segmentation and depth according to one embodiment.

FIG. 6 illustrates an embodiment of a computing environment capable of supporting and implementing one or more embodiments according to one embodiment.

DETAILED DESCRIPTION

Figure 2:
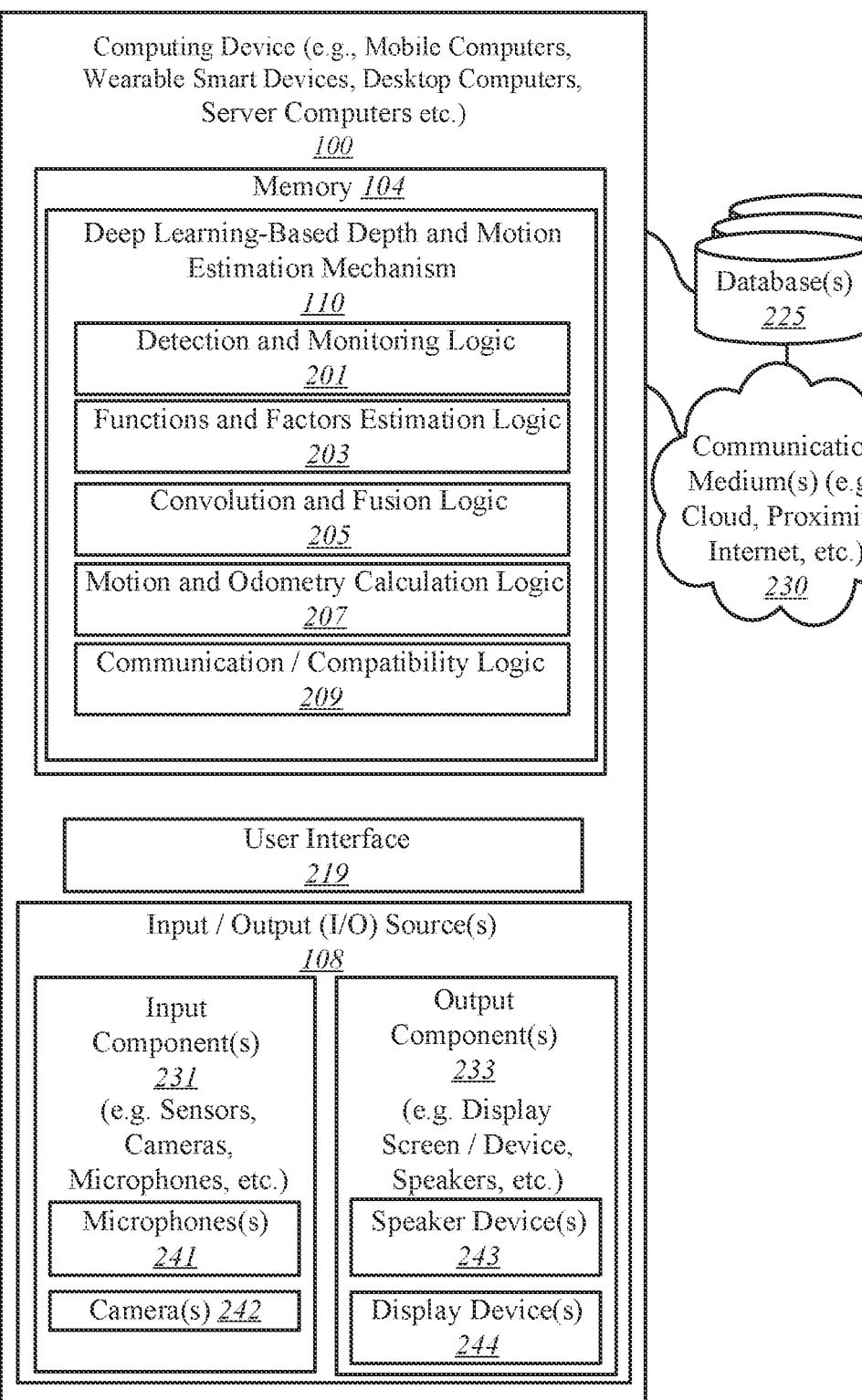
FIG. 2 illustrates a deep learning-based depth and motion estimation mechanism according to one embodiment.

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for a novel technique for estimating various scene factors using neural networks along with supervising motion and odometry in machine learning environments. In one embodiment, scene factors like (not limited to) pixel depth, velocity, class, optical flow, etc., are estimated using neural networks, such as a deep recurrent neural network (RNN).

Further, for example, if a camera motion is already available, then additional constraint is used based on a deep RNN, where if the camera is fixed, such as on a vehicle, the camera's motion may still be obtained through odometry sensors. In one embodiment, multiple scene factors, such as pixel depth, velocity, segmentation, optical flow, etc., are obtained simultaneously, while different loss functions are combined together to obtain a final cost function. In some embodiments, an RNN may be implemented as a convolutional long short-term memory (LSTM) network.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referred to as "work unit" or "draw" and similarly, "application" may be interchangeably referred to as "workflow" or simply "agent".

For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

It is to be noted that terms or acronyms like convolutional neural network (CNN), CNN, neural network (NN), NN, deep neural network (DNN), DNN, recurrent neural network (RNN), RNN, and/or the like, may be interchangeably referenced throughout this document. Further, terms like "autonomous machine" or simply "machine", "autonomous vehicle" or simply "vehicle", "autonomous agent" or simply "agent", "autonomous device" or "computing device", "robot", and/or the like, may be interchangeably referenced throughout this document.

FIG. 1 illustrates a computing device 100 employing a deep learning ("DL")-based depth and motion estimation ("DL-based estimation") mechanism 110 according to one embodiment. Computing device 100 represents a communication and data processing device including or representing (without limitations) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet-based cable television set-top boxes, etc.), global positioning system (GPS)-based devices, automotive infotainment devices, etc.

In some embodiments, computing device 100 includes or works with or is embedded in or facilitates any number and type of other smart devices, such as (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a computer platform hosting an integrated circuit ("IC"), such as a system on a chip ("SoC" or "SOC"), integrating various hardware and/or software components of computing device 100 on a single chip.

As illustrated, in one embodiment, computing device 100 may include any number and type of hardware and/or software components, such as (without limitation) graphics processing unit ("GPU" or simply "graphics processor")

114, graphics driver (also referred to as "GPU driver", "graphics driver logic", "driver logic", user-mode driver (UMD), UMD, user-mode driver framework (UMDF), UMDF, or simply "driver") 116, central processing unit ("CPU" or simply "application processor") 112, memory 104, network devices, drivers, or the like, as well as input/output (I/O) source(s) 108, such as touchscreens, touch panels, touch pads, virtual or regular keyboards, virtual or regular mice, ports, connectors, etc. Computing device 100 may include operating system (OS) 106 serving as an interface between hardware and/or physical resources of the computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", "circuitry", "element", and "mechanism" may include, by way of example, software, hardware and/or a combination thereof, such as firmware.

In one embodiment, as illustrated, DL-based estimation mechanism 110 may be hosted by memory 104 in communication with I/O source(s) 108, such as microphones, speakers, etc., of computing device 100. In another embodiment, DL-based estimation mechanism 110 may be part of or hosted by operating system 106. In yet another embodiment, DL-based estimation mechanism 110 may be hosted or facilitated by graphics driver 116. In yet another embodiment, DL-based estimation mechanism 110 may be hosted by or part of graphics processing unit ("GPU" or simply graphics processor") 114 or firmware of graphics processor 114; for example, DL-based estimation mechanism 110 may be embedded in or implemented as part of the processing hardware of graphics processor 114, such as in the form of DL-based estimation component 120. Similarly, in yet another embodiment, DL-based estimation mechanism 110 may be hosted by or part of central processing unit ("CPU" or simply "application processor") 112; for example, DL-based estimation mechanism 110 may be embedded in or implemented as part of the processing hardware of application processor 112, such as in the form of DL-based estimation component 130.

It is contemplated that this novel technique is limited to a software implementation or a hardware implementation and, as will be further described in this document, this novel technique may be applied and implemented in software, hardware, or any combination thereof, such as firmware. It is contemplated that embodiments are not limited to certain implementation or hosting of DL-based estimation mechanism 110 and that one or more portions or components of DL-based estimation mechanism 110 may be employed or implemented as hardware, software, or any combination thereof, such as firmware.

Computing device 100 may host network interface device (s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

FIG. 2 illustrates deep learning-based depth and motion estimation mechanism 110 of FIG. 1 according to one embodiment. For brevity, many of the details already discussed with reference to FIG. 1 are not repeated or discussed hereafter. In one embodiment, DL-based estimation mechanism 110 may include any number and type of components, such as (without limitations): detection and monitoring logic 201; functions and factors estimation logic 203; convolution and fusion logic 205; motion and odometry calculation logic 207; and communication/compatibility logic 209.

Computing device 100 is further shown to include user interface 219 (e.g., graphical user interface (GUI)-based user interface, Web browser, cloud-based platform user interface, software application-based user interface, other user or application programming interfaces (APIs), etc.). Computing device 100 may further include I/O source(s)

108 having input component(s) 231, such as camera(s) 242 (e.g., Intel® RealSense™ camera), sensors, microphone(s) 241, etc., and output component(s) 233, such as display device(s) or simply display(s) 244 (e.g., integral displays, tensor displays, projection screens, display screens, etc.), speaker devices(s) or simply speaker(s), etc.

Computing device 100 is further illustrated as having access to and/or being in communication with one or more database(s) 225 and/or one or more of other computing devices over one or more communication medium(s) 230 (e.g., networks such as a proximity network, a cloud network, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or preferred details, and/or the like.

As aforementioned, computing device 100 may host I/O source(s) 108 including input component(s) 231 and output component(s) 233. In one embodiment, input component(s) 231 may include a sensor array including, but not limited to, microphone(s) 241 (e.g., ultrasound microphones), camera(s) 242 (e.g., two-dimensional (2D) cameras, three-dimensional (3D) cameras, infrared (IR) cameras, depth-sensing cameras, etc.), capacitors, radio components, radar components, scanners, and/or accelerometers, etc. Similarly, output component(s) 233 may include any number and type of display device(s) 244, projectors, light-emitting diodes (LEDs), speaker(s) 243, and/or vibration motors, etc.

As aforementioned, terms like "logic", "module", "component", "engine", "circuitry", "element", and "mechanism" may include, by way of example, software or hardware and/or a combination thereof, such as firmware. For example, logic may itself be or include or be associated with circuitry at one or more devices, such as DL-based estimation component 130 and/or DL-based estimation component 120 hosted by application processor 112 and/or graphics processor 114, respectively, of FIG. 1 having to facilitate or execute the corresponding logic to perform certain tasks.

For example, as illustrated, input component(s) 231 may include any number and type of microphones(s) 241, such as multiple microphones or a microphone array, such as ultrasound microphones, dynamic microphones, fiber optic microphones, laser microphones, etc. It is contemplated that one or more of microphone(s) 241 serve as one or more input devices for accepting or receiving audio inputs (such as human voice) into computing device 100 and converting this audio or sound into electrical signals. Similarly, it is contemplated that one or more of camera(s) 242 serve as one or more input devices for detecting and capturing of image and/or videos of scenes, objects, etc., and provide the captured data as video inputs into computing device 100.

As described earlier, conventional techniques use structure-from-motion (SFM) algorithms to obtain camera motions and three-dimensional (3D) structures of a scene captured by cameras. Such conventional techniques are inherently unreliable since they are not capable of providing any estimation of depth without having some assumption of a model of an environment. For example, any depth involving a single camera is severely limited in that it can only be estimated up to a scaling factor Embodiments provide for a novel technique for estimating various scene factors using neural networks along with supervising motion and odometry in machine learning environments. In one embodiment, scene factors like (not limited to) pixel depth, velocity, class, optical flow, etc., are estimated using neural networks, such as a deep recurrent neural network (RNN).

Further, for example, if a camera motion is already available, then additional constraint is used based on a deep RNN, where if the camera is fixed, such as on a vehicle, the camera's motion may still be obtained through odometry sensors. In one embodiment, multiple scene factors, such as pixel depth, velocity, segmentation, optical flow, etc., are obtained simultaneously, while different loss functions are combined together to obtain a final cost function. In some embodiments, an RNN may be implemented as a convolutional long short-term memory (LSTM) network.

In one embodiment, detection and monitoring logic 201 may be used to detect and monitor camera(s) 242 and one or more scenes captured by camera(s) 242, where functions and factors estimation logic 203 is used to estimate one or more factors associated with the scene using neural networks, such as deep RNNs. For example, functions and factors estimation logic 203 may be used to simultaneously estimate one or more factors, such as pixel depth, velocity, class, optical flow, etc., using a deep RNN. Further, for example, deep convolutional LSTM layers are used for training purposes, where the estimated values associated with the scene. In one embodiment, using the convolution and fusion logic 205, the loss functions for the estimations of the various scene factors, such as depth, velocity, class, and motion estimations are fused together in a cumulated loss function.

In one embodiment, for each object, rotation matrixes and translation vectors are estimated using motion and odometry calculation logic 207, where any segmentation and motion estimation are fused together in a supervised manner. Further, in one embodiment, using motion and odometry calculation logic 207, any motion estimation results are constrained by odometry information, which allows for getting metric values of pixel depth. Stated different, using neural networks, like deep RNNs, embodiments provide for estimating scene factors like pixel depth, velocity, optical, and segmentation simultaneously, while the depth is not given up to scale, but rather, with metric values.

In one embodiment, prediction for a frame, such as a next frame, is made by using an RNN, as facilitated by functions and factors estimation logic 203 such that this novel technique is also used for estimating other factors, such as pixel depth, velocity, class, etc., simultaneously. In one embodiment, as will be further illustrated with respect to the subsequent figures, deep learning is used to estimate depth of scenes captured by camera(s) 242, where, for example, this novel technique is not dependent on any assumption of models; rather, this novel technique provides for reliable and accurate estimations of depth and other factors associated with scenes and its contents, such as objects, as capture by one or more of camera(s) 242.

Further, embodiments provide for a novel technique for simultaneous estimation of depths associated with various factors corresponding to various frames using RNNs. For example, multiple image frames and their sequences are offered to an RNN using LSTM, where each frame generates convolutional LSTM at a different scale. Further, for example, the RNN gives predication of LSTM states for a next frame for a different level as continuous on.

As illustrated with respect to FIG. 3B, in one embodiment, a current frame may be used as an input of for a multitask prediction algorithm, where a combined loss function is used for predicting various scene factors, such as pixel depth, velocity, optical flow, and class information, etc., as facilitated by functions and factors estimation logic 203. In one embodiment, as further illustrated with respect to FIG. 3B, convolution and fusion logic 205 may be used to combine the loss functions and predict the varying factors, such as pixel depth, velocity, optical flow, and class information. Further, any SFM information is fused with deep learning as facilitated by convolution and fusion logic 205, where the pixels are grouped together as the same objects are tracked for rotation matrix and translation vector estimations. These estimations are then used to calculate the pixel optical flow between frames as facilitated by motion and odometry calculation logic 207.

Multitask Loss Functions

In one embodiment, a final cost function of a multitask loss functions in the training is based on individual loss functions, such as for depth estimation cost function, as facilitated by functions and factors estimation logic 203 and as follows:

$$L_{depth}=\Sigma\|D_i-D_{GTi}\| \quad\quad\quad (Eq. 1)$$

Where $D_i$ and $D_{GT}$ are regarded as errors of individual pixel depth estimation.

Similarly, in one embodiment, velocity estimation cost function is estimated by functions and factors estimation logic 203 and as follows:

$$L_{velocity}=\Sigma\|v_i-v_{GTi}\| \quad\quad\quad (Eq. 2)$$

Where the estimated velocity is compared with the ground truth.

In some embodiments, full segmentation of an image may be implemented using one or more algorithms or techniques, such as Softmax algorithm, while cost function relating to supervised motion and odometry information are shown below, as facilitated by motion and odometry calculation logic 207.

Supervised Motion

Now, for example, with regard to supervised motion, as facilitated by motion and odometry calculation logic 207, various segmented points may be grouped together as objects such that their rotation matrixes, such as $R_1$, $R_2$, ... $R_n$, and translation vectors, such as $T_1$, $T_2$, ... $T_n$, are estimated using a neural network, such as a deep RNN. For example, assuming the camera rotation is $R_{cam}$ and its translation is $T_{cam}$, then any point X belonging to l-th object may move to a new location, such as:

$$X'=R_lX+T_l \quad\quad\quad (Eq. 3)$$

It is contemplated that, for example, one of camera(s) 242 may have it own motion and to project X into the second frame, the following is obtained, as facilitate by motion and odometry calculation logic 207:

$$x_{im}=K(R_{cam}(R_lX+T_l)+T_{cam}) \quad\quad\quad (Eq. 4)$$

The intensity of the pixel couple in the two neighboring frames is the same, where the cost functions relating to a supervised component are obtained, as facilitated by functions and factors estimation logic 203 and as follows:

$$L_{intensity\_smooth}=\Sigma\|I_t(x,y)-I_{t+1}(x+x_{flow},y+y_{flow})\| \quad (Eq. 5)$$

Besides the depths of the corresponding pixel, any neighboring couples are expected to have a smooth transformation, which then helps generate another depth cost function, as facilitated by functions and factors logic 203 and as follows:

$$L_{depth\_smooth}=\rho\|d_t(x,y)+Z_{flow}-d_{t+1}(x+x_{flow},y+y_{flow})\| \quad (Eq. 6)$$

Where $Z_{flow}$ refers to the z component of the 3D point cloud flow.

If, for example, the ground truth regarding the camera motion of camera(s) 242 and the object motion is known, then the error in the rotation matrix estimation is obtained through motion and odometry calculation logic 207 and as follows:

$$errR = R_{cam} * R_{camGT}{}^T \qquad \text{(Eq. 7)}$$

The above equation states that the forward and backward rotations are given identity matrix, while any error relating to the translation is as follows:

$$errT = R_{cam}{}^{T} * (T_{camGT} - T_{cam}) \qquad \text{(Eq. 8)}$$

In going through the process, as facilitated by functions and factors estimation logic 203 and one or more other components of DL-based estimation mechanism 110, the cost function for rotation matrix similar to that of Eq. 4 is obtained as follows:

$$L_{rotation} = \left\| \arccos\left( \min\left(1, \max\left(-1, \frac{\text{trace}(errR) - 1}{2}\right)\right)\right)\right\| \qquad \text{(Eq. 9)}$$

and the cost function for the translation is as follows:

$$L_{translation} = \|errT\| \qquad \text{(Eq. 10)}$$

Further, with regard to odometry, as facilitated by motion and odometry calculation logic 207, any depth values obtained until now are defined by the precision of a scaling factor, where this may be obtained from the perspective of a single camera of camera(s) 242. Now, for example, without any implicit or explicit information about the camera motion (e.g., baseline between the frames), a scene structure may be estimated up the scaling factor as facilitated by motion and odometry calculation logic 207. If, however, certain information about the camera motion is known, such as from the vehicle as modified in Equations 9 and 10, then the scene structure may be estimated closer to the values based on the odometry information, leading to converting of the depth estimation to metric values as facilitated by convolution and fusion logic 205.

When comparing depth estimations as obtained from conventional techniques and this neural network-based novel technique, the recurrent method of the novel technique is regarded as far superior of the conventional techniques as, for example, the recurrent novel technique offers a much lower root mean square then a non-recurrent conventional technique.

Moreover, in one embodiment, the novel technique for RNN-based depth estimation supports both supervised an unsupervised learning, where the supervised learning is a process by which a neural network architecture optimizes the parameters used by its neurons in order to perform a specific task. For example, some neuron functions may be found redundant as part of the training process, where gradient descent is replaced with a neuron elimination process, which is also associated with the survival of the most relevant features. Such process may be more easily extended to unsupervised learning. In the case of unsupervised learning, the presence of a new set of common, frequently encountered features among a set of visual inputs is an indication of a new, previously unknown object class. In this way, learning is supported without any explicit labeling.

It is contemplated that embodiments are not limited to any number or type of microphone(s) 241, camera(s) 242, speaker(s) 243, display(s) 244, etc. For example, as facilitated by detection and monitoring logic 201, one or more of microphone(s) 241 may be used to detect speech or sound simultaneously from users, such as speakers. Similarly, as facilitated by detection and monitoring logic 201, one or more of camera(s) 242 may be used to capture images or videos of a geographic location (whether that be indoors or outdoors) and its associated contents (e.g., furniture, electronic devices, humans, animals, trees, mountains, etc.) and form a set of images or video streams.

Similarly, as illustrated, output component(s) 233 may include any number and type of speaker(s) or speaker device(s) 243 to serve as output devices for outputting or giving out audio from computing device 100 for any number or type of reasons, such as human hearing or consumption. For example, speaker(s) 243 work the opposite of microphone(s) 241 where speaker(s) 243 convert electric signals into sound.

Further, input component(s) 231 may further include any number and type of cameras, such as depth-sensing cameras or capturing devices (e.g., Intel® RealSense™ depth-sensing camera) that are known for capturing still and/or video red-green-blue (RGB) and/or RGB-depth (RGB-D) images for media, such as personal media. Such images, having depth information, have been effectively used for various computer vision and computational photography effects, such as (without limitations) scene understanding, refocusing, composition, cinema-graphs, etc. Similarly, for example, displays may include any number and type of displays, such as integral displays, tensor displays, stereoscopic displays, etc., including (but not limited to) embedded or connected display screens, display devices, projectors, etc.

Input component(s) 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more input component(s) 231 may further include one or more of supporting or supplemental devices for capturing and/or sensing of data, such as illuminators (e.g., IR illuminator), light fixtures, generators, sound blockers, etc.

It is further contemplated that in one embodiment, input component(s) 231 may further include any number and type of context sensors (e.g., linear accelerometer) for sensing or detecting any number and type of contexts (e.g., estimating horizon, linear acceleration, etc., relating to a mobile computing device, etc.). For example, input component(s) 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, input component(s) 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and/or TEE logic. TEE logic may be employed separately or be part of resource requestor and/or an I/O subsystem, etc. Input component(s) 231 may further include voice recognition devices, photo recognition devices, facial and other body recognition components, voice-to-text conversion components, etc.

Similarly, output component(s) 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output component(s) 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiment are not limited to any number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as computing device 100, and may be referenced interchangeably with "person", "individual", "human", "him", "her", "child", "adult", "viewer", "player", "gamer", "developer", "programmer", and/or the like.

Communication/compatibility logic 209 may be used to facilitate dynamic communication and compatibility between various components, networks, computing devices, database(s) 225, and/or communication medium(s) 230, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s)

(e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", "circuitry", and/or the like, may be referenced interchangeably and include, by way of example, software, hardware, and/or any combination of software and hardware, such as firmware. In one example, "logic" may refer to or include a software component that works with one or more of an operating system, a graphics driver, etc., of a computing device, such as computing device 100. In another example, "logic" may refer to or include a hardware component that is capable of being physically installed along with or as part of one or more system hardware elements, such as an application processor, a graphics processor, etc., of a computing device, such as computing device 100. In yet another embodiment, "logic" may refer to or include a firmware component that is capable of being part of system firmware, such as firmware of an application processor or a graphics processor, etc., of a computing device, such as computing device 100.

Further, any use of a particular brand, word, term, phrase, name, and/or acronym, such as "neuron", "neural network", "deep neural network", "recurrent deep neural network", "functions", "factors", "depth", "pixel depth", "velocity", "class", "optical flow", supervised motion", "odometry", "machine learning interface", "machine learning model", "neural network", "creating", "training", "inferencing", "classifying", "scoring", "RealSense™ camera", "real-time", "automatic", "dynamic", "user interface", "camera", "sensor", "microphone", "display screen", "speaker", "verification", "authentication", "privacy", "user", "user profile", "user preference", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from DL-based estimation mechanism 110 and/or one or more of DL-based estimation components 120, 130 of FIG. 1 to facilitate various embodiments including adding, removing, and/or enhancing certain features. For brevity, clarity, and ease of understanding of DL-based estimation mechanism 110, many of the standard and/or known components, such as those of a computing device, are not shown or discussed here. It is contemplated that embodiments, as described herein, are not limited to any technology, topology, system, architecture, and/or standard and are dynamic enough to adopt and adapt to any future changes.

FIG. 3A illustrates a convolutional LSTM architecture 300 according to one embodiment. As illustrated, in this convolutional LSTM architecture 300, the transaction sequence involves generating at each frame a convolutional LSTM at a different scale, such as convolutional LSTM frames 301, 303, 305, 307, 309. Further, each of LSTM frames 301-309 comes from a previous frame as an output and moves to a next frame as an input, where these convolutional LSTM frames 301-309 are of a different scale at each passing level.

FIG. 3B illustrates a deep RNN architecture 350 according to one embodiment. For the sake of brevity, many of the details previously mentioned or discussed with reference to FIGS. 1-3A may not be discussed or repeated hereafter. Further, it is contemplated that any processes or transactions with this and other illustrations may be performed by processing logic that may comprise hardware (e.g., circuitry, dedicated logic, programmable logic, etc.), software (such as instructions run on a processing device), or a combination thereof, as facilitated by DL-based estimation mechanism 110 and/or one or more of DL-based estimation components 120, 130 of FIG. 1. Any processes or transactions associated with this and other illustrations may be illustrated or recited in linear sequences for brevity and clarity in presentation; however, it is contemplated that any number of them can be performed in parallel, asynchronously, or in different orders.

In the illustrated embodiment, a transaction sequence across the novel deep RNN architecture 350 may involve inputting of a current frame, such as frame 351, into convolutional LSTM architecture 300 for multitask predictions and computations. This frame 351 may be an image or a stream obtained from a scene captured by one or more of camera(s) 242 of FIG. 2. For example, as illustrated, frame 351 is proceed though convolutional LSTM architecture 300 and outputted as frame 353, as facilitated by convolution and fusion logic 205 of FIG. 2, where output frame 353 is then used for estimation of scene factors 361, 363, 365, 367 based on combined loss function 355 as facilitated by functions and factors estimation logic 203 of FIG. 2.

In one embodiment, as further described with reference to FIG. 2, multiple factors associated with a scene are predicted or estimated simultaneously representing combined loss function 355 of the scene as facilitated by functions and factors estimation logic 203 of FIG. 2. Stated different, combined loss function 355 is used to predict the varying scene factors, such as pixel depth 361, pixel velocity 363, segmentation 365, and optical flow 367, etc. that are all predicted or estimated simultaneously and based on output frame 353 of convolutional LSTM architecture 300, as facilitated by functions and factors estimation logic 203 of FIG. 2. For example, in some embodiments, any known SFM information may be fused with deep learning, as facilitated by convolution and fusion logic 205 of FIG. 2, such that any pixels are grouped together as the same object and are tracked for rotation matrix and translation vector estimation. These estimations may then be used to calculate the pixel optical flow between frames.

Further, in one embodiment, factors like pixel depth 361 and segmentation 365 may be used as supervised components 379, where pixel depth 361 is used to converge into metric values 371, while segmentation 365 is used for rotation and translation for each of the objects 373 captured in the scene captured by one or more cameras, and rotation and translation for the one or more cameras 375. In one embodiment, factors like pixel depth 361 and segmentation 365 are identified and used as supervised components 379 through odometry-based camera motion estimation 377 as facilitated by motion and odometry calculation logic 207 of FIG. 2.

Figure 4A:
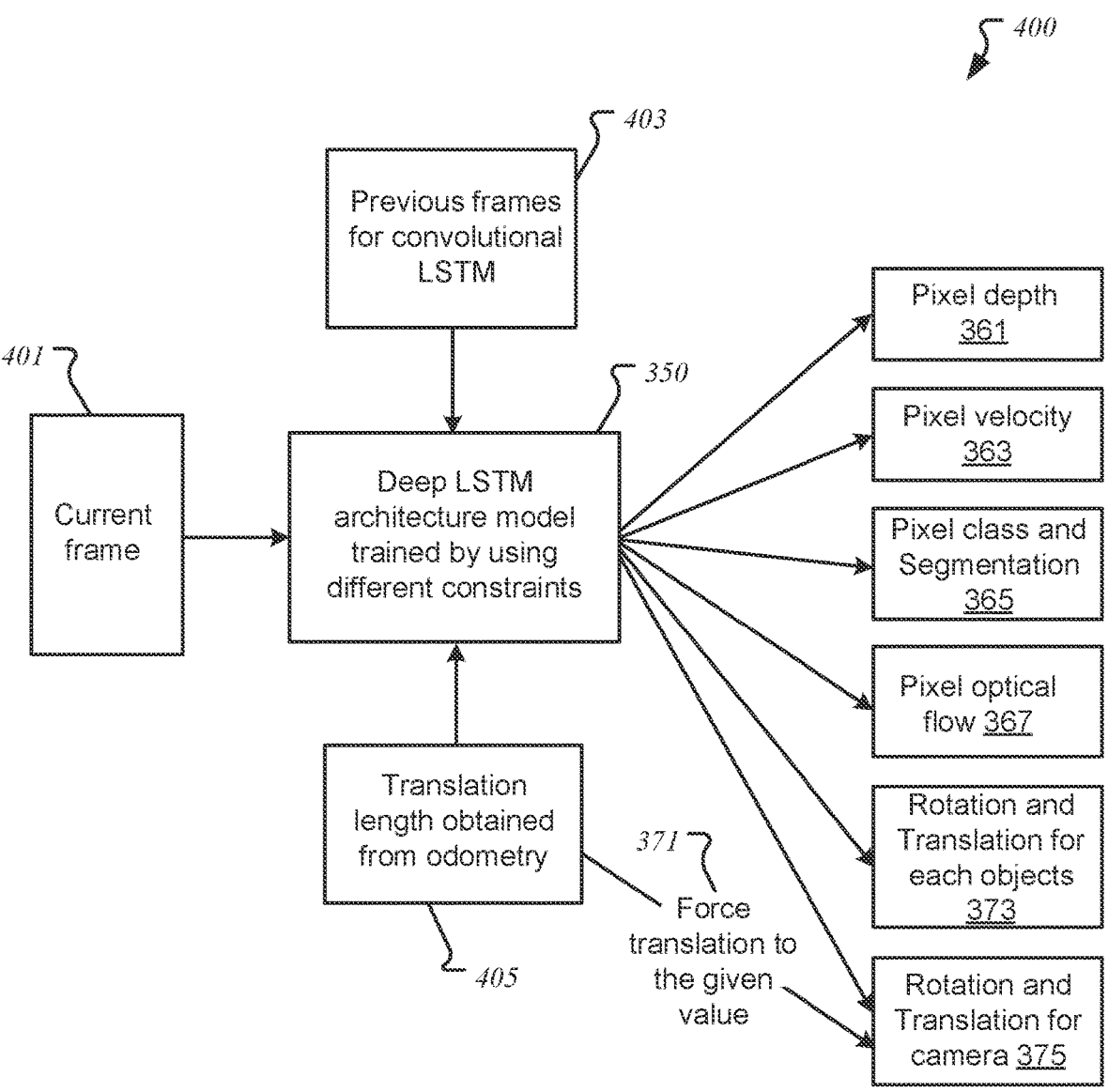
FIG. 4A illustrates a transaction sequence for deep neural network architecture-based estimation of depth and motion according to one embodiment according to one embodiment.

FIG. 4A illustrates a transaction sequence 400 for deep neural network architecture-based estimation of depth and motion according to one embodiment. For the sake of brevity, many of the details previously mentioned or discussed with reference to FIGS. 1-3B may not be discussed or repeated hereafter. Further, it is contemplated that any processes or transactions with this and other illustrations may be performed by processing logic that may comprise hardware (e.g., circuitry, dedicated logic, programmable logic, etc.), software (such as instructions run on a processing device), or a combination thereof, as facilitated by DL-based estimation mechanism 110 and/or one or more of DL-based estimation components 120, 130 of FIG. 1. Any processes or transactions associated with this and other illustrations may be illustrated or recited in linear sequences for brevity and clarity in presentation; however, it is contemplated that any number of them can be performed in parallel, asynchronously, or in different orders.

As illustrated, transaction sequence 400 begins with inputting of current frame 401 from a scene captured by a camera into LSTM/deep RNN architecture 350, where, in some embodiments, architecture 350 further receives inputs of previous frames 403 for convolution LSTM architecture, such as LSTM architecture 300 of FIG. 3A, and any translation length obtained from odometry 405.

As described with reference to FIGS. 2 and 3B, with these inputs 401, 403, 405, architecture 350 performs the one or more of predictions, estimations, and calculations to offer one or more of pixel depth 361, pixel velocity 363, pixel class and segmentation 365, pixel optical flow 367, rotation and translation for each object 373, rotation and translation for camera 375, etc., based on a combined loss function, along with forced translation to metric values 371 based on odometry-based translation length 405, to further provide odometry-based camera motion estimation.

Figure 4B:
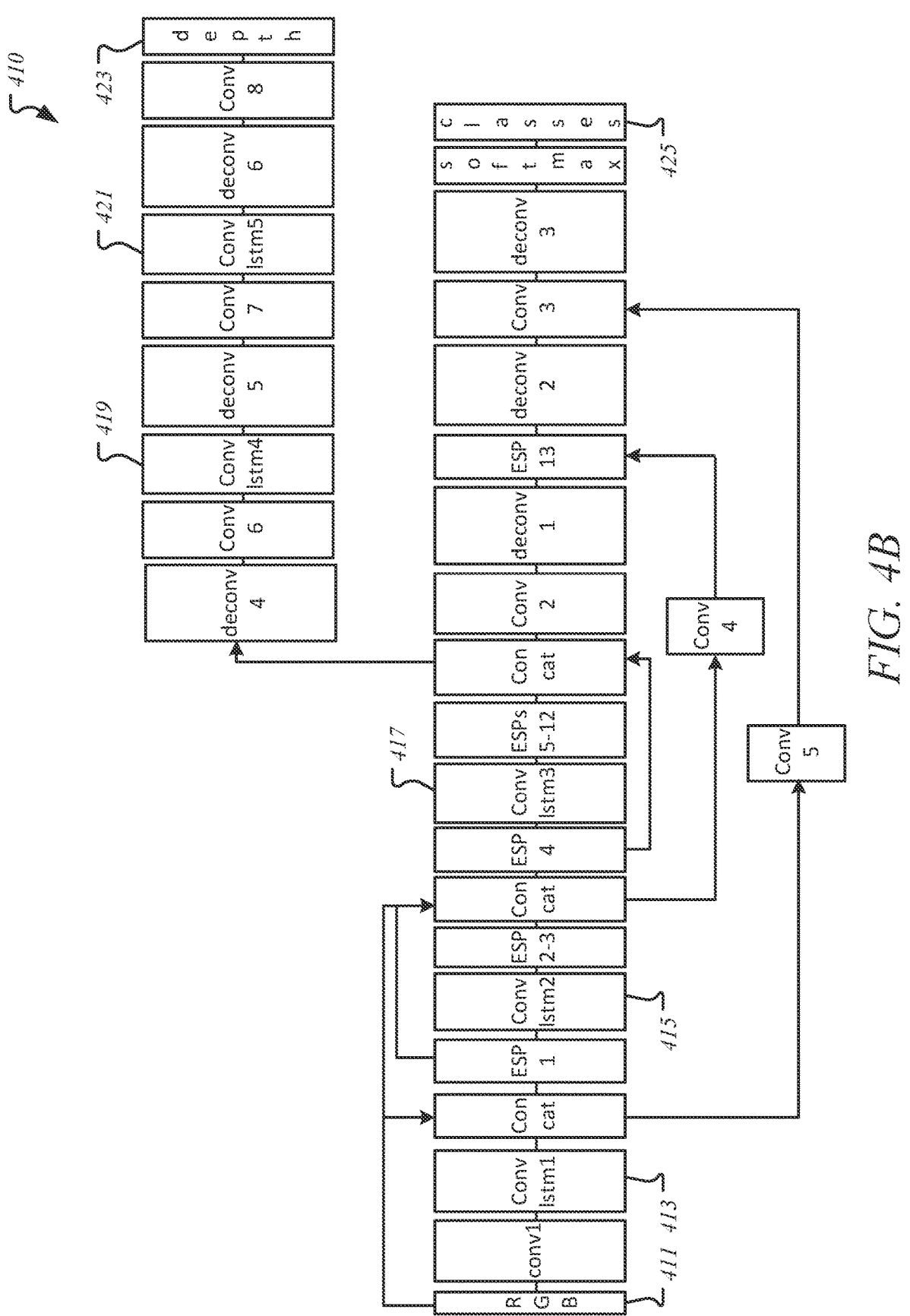
FIG. 4B illustrates a transaction sequence for full segmentation and depth estimation according to one embodiment.

FIG. 4B illustrates a transaction sequence 410 for full segmentation and depth estimation according to one embodiment. For the sake of brevity, many of the details previously mentioned or discussed with reference to FIGS. 1-4A may not be discussed or repeated hereafter.

In the illustrated embodiment, as facilitated by DL-based estimation mechanism 110 and/or one or more of DL-based estimation components 120, 130 of FIG. 1, transaction sequence 410 for full segmentation and depth begins with an input of a frame, such as red green blue (RGB) frame 411. This frame 411, as illustrated and explained with reference to the previous figures, is processed through and as convolutional LSTMs 413, 415, 417, 419, 421 at various levels and stages, along with further neural network-based convolutions, deconvolutions, and efficient spatial pyramid (ESP) modules, etc., to then produce depth 423 and classes 425, such as through convolution and Softmax algorithm, respectively.

Figure 4C:
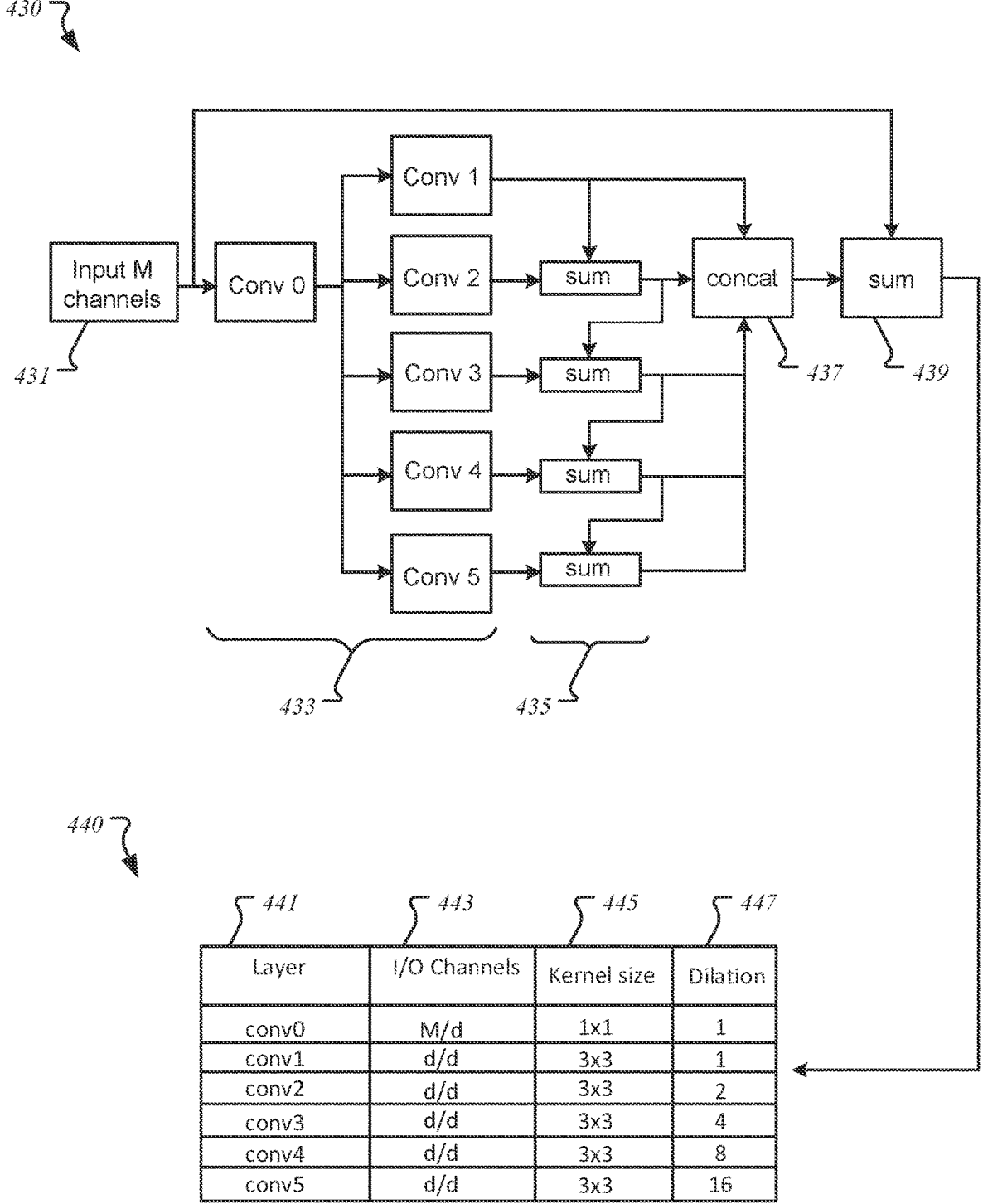
FIG. 4C illustrates a transaction sequence associated with an efficient special pyramid module according to one embodiment.

FIG. 4C illustrates a transaction sequence 430 associated with an ESP module according to one embodiment. For the sake of brevity, many of the details previously mentioned or discussed with reference to FIGS. 1-4B may not be discussed or repeated hereafter.

As described with reference to transaction sequence 410 of FIG. 4B, ESP modules may be part of neural network-based segmentation and depth analysis. In this illustration, transaction sequence 430 of an ESP module may include M channels input 431 that is then put through a number of convolutions 433, summations 435, concatenation 437, and set again, summation 439 that is represented in table 440. As illustrated, table 440 includes a list of layers 441, input/output (I/O channels 443, kernel size 445, and dilation 447, where d=M/5.

FIG. 4D illustrates multiple tables 451, 453, 455 associated with fusion segmentation and depth according to one embodiment. For the sake of brevity, many of the details previously mentioned or discussed with reference to FIGS. 1-4C may not be discussed or repeated hereafter.

As described with reference to transaction sequence 410 of fusion segmentation and depth of FIG. 4B, fusion segmentation and depth may be represented through a number of charts or tables, such as tables 451, 453, 455. As illustrated, in one embodiment, table 451 lists common layers, table 453 lists semantic layers, while table 455 lists depth layers associated with fusion segmentation and depth corresponding to an image of a scene captured by one or more cameras.

Figure 4E:
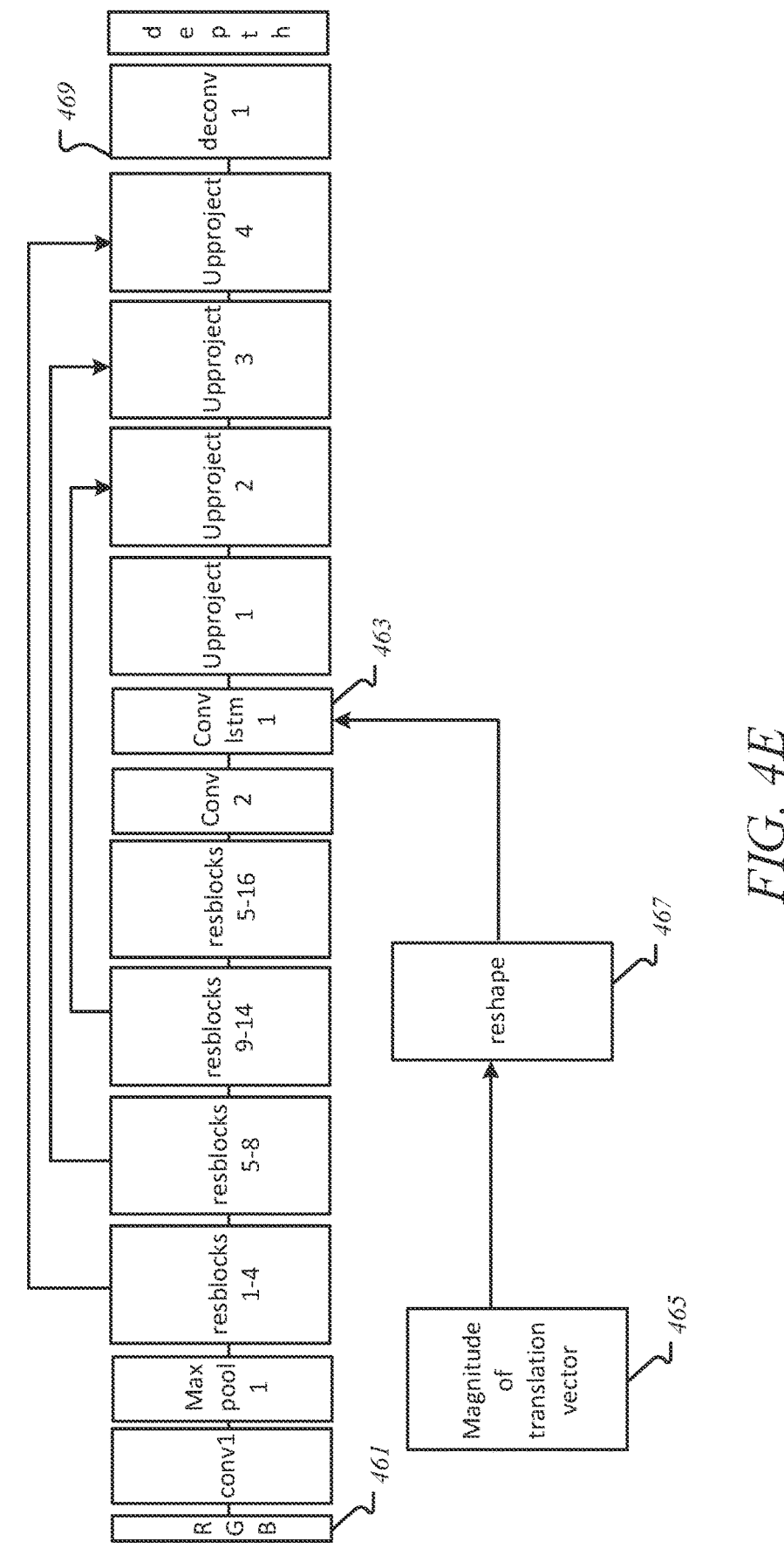
FIG. 4E illustrates a transaction sequence for odometry input-based fusion according to one embodiment.

FIG. 4E illustrates a transaction sequence 460 for odometry input-based fusion according to one embodiment. For the sake of brevity, many of the details previously mentioned or discussed with reference to FIGS. 1-4D may not be discussed or repeated hereafter.

As illustrated, transaction sequence 460 begins with RGB input 461, which is then processed through until it is converted into convolutional LSTM 1 463, where, in one embodiment, reshape input 467 is accepted that is based on odometry input-based magnitude of translation vector 465. This transaction sequence 460 then continues with other processes, resulting in an output of depth 469.

Figure 4F:
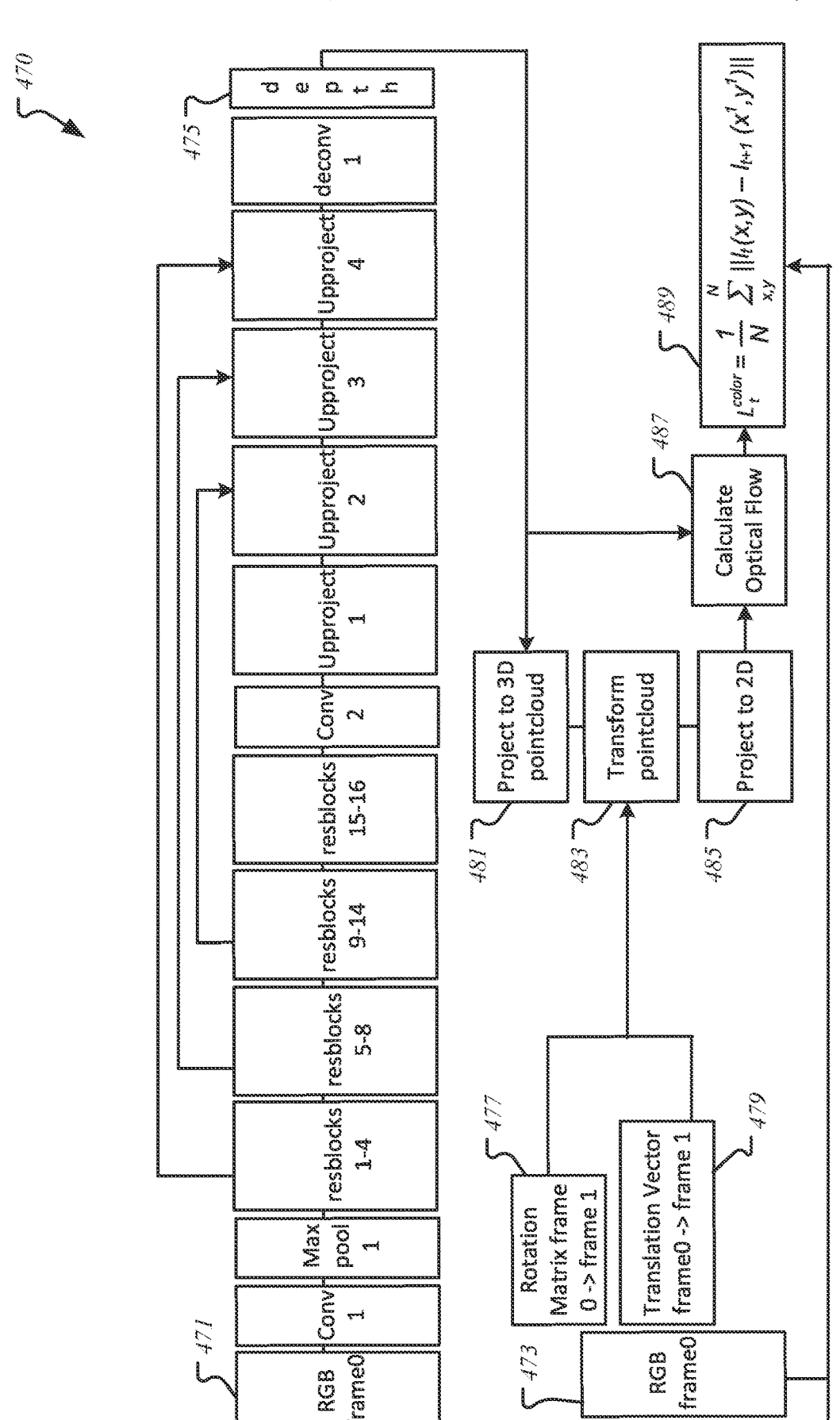
FIG. 4F illustrates a transaction sequence for odometry supervision-based fusion according to one embodiment according to one embodiment.

FIG. 4F illustrates a transaction sequence 470 for odometry supervision-based fusion according to one embodiment. For the sake of brevity, many of the details previously mentioned or discussed with reference to FIGS. 1-4E may not be discussed or repeated hereafter.

In the illustrated embodiment, transaction sequence 470 starts with an input of RBG frame 0 471 that is the sent through various processes, as described earlier, to output depth 475. This depth 475 is then inputted into another parallel or subsequent process involving rotation matrix 477 from frame 0 471 to RGB from 1 473 and translation vector 479 of frame 0 471 to frame 1 473, where rotation matrix 477 and translation vector 479 to provide transform point cloud 483 to produce project 2D 485, which subsequently used for calculating optical flow 487.

In one embodiment transform point cloud 483 is further associated with project to 3D point cloud 481, which benefits from the input of depth 475 as does calculation of optical flow 487, resulting estimations based on the following equation at block 489:

$$L_t^{color} = \frac{1}{N} \sum_{x,y}^{N} \|I_t(x, y) - I_{t+1}(x', y')\|$$

Figure 5:
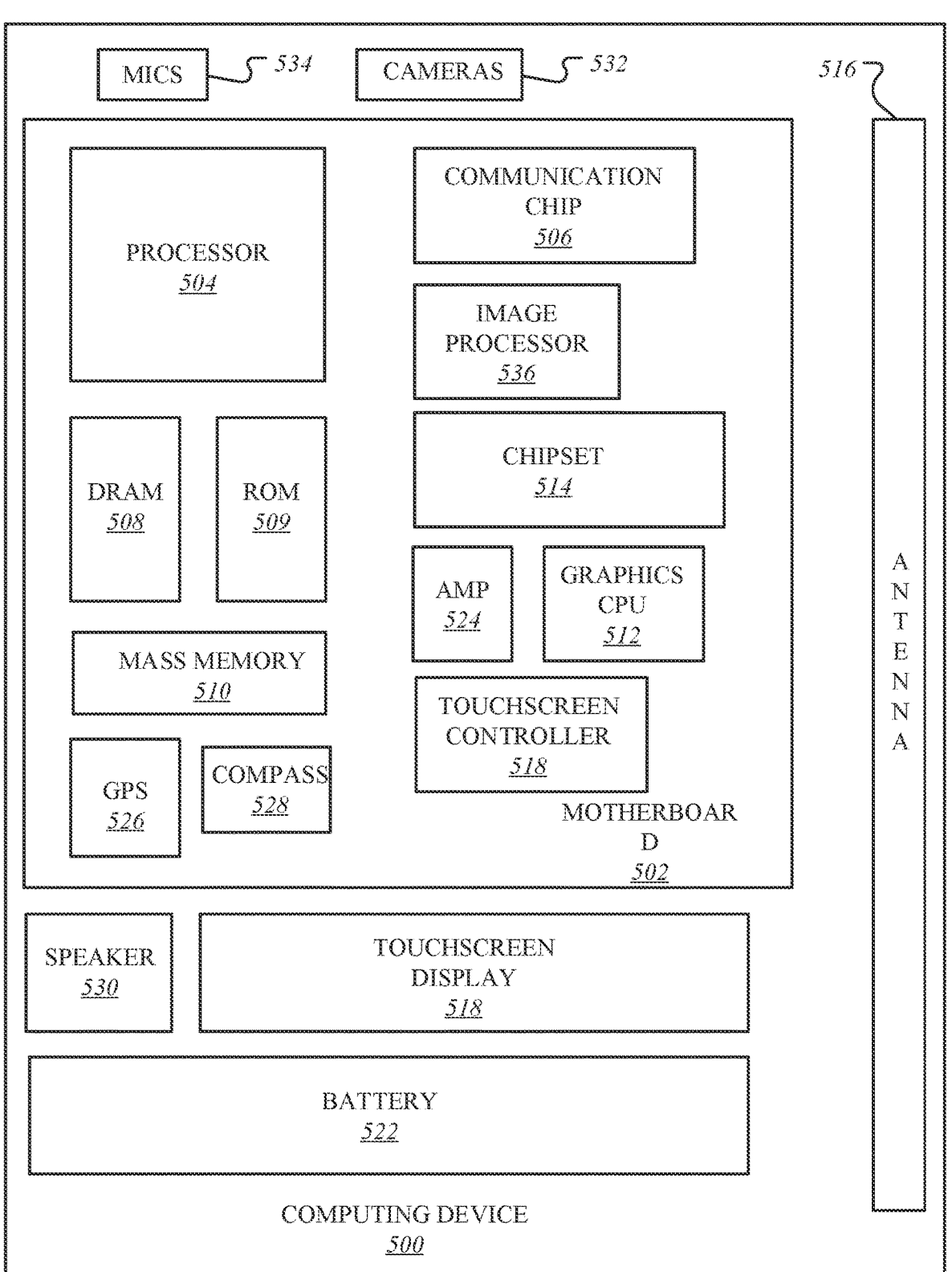
FIG. 5 illustrates a computer device capable of supporting and implementing one or more embodiments according to one embodiment.

FIG. 5 illustrates a computing device 500 in accordance with one implementation. The illustrated computing device 500 may be same as or similar to computing device 100 of FIG. 1. The computing device 500 houses a system board 502. The board 502 may include a number of components, including but not limited to a processor 504 and at least one communication package 506. The communication package is coupled to one or more antennas 516. The processor 504 is physically and electrically coupled to the board 502.

Depending on its applications, computing device 500 may include other components that may or may not be physically and electrically coupled to the board 502. These other components include, but are not limited to, volatile memory (e.g., DRAM) 508, non-volatile memory (e.g., ROM) 509, flash memory (not shown), a graphics processor 512, a digital signal processor (not shown), a crypto processor (not shown), a chipset 514, an antenna 516, a display 518 such as a touchscreen display, a touchscreen controller 520, a battery 522, an audio codec (not shown), a video codec (not shown), a power amplifier 524, a global positioning system (GPS) device 526, a compass 528, an accelerometer (not shown), a gyroscope (not shown), a speaker 530, cameras 532, a microphone array 534, and a mass storage device (such as hard disk drive) 510, compact disk (CD) (not shown), digital versatile disk (DVD) (not shown), and so forth). These components may be connected to the system board 502, mounted to the system board, or combined with any of the other components.

The communication package 506 enables wireless and/or wired communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 506 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 500 may include a plurality of communication packages 506. For instance, a first communication package 506 may be dedicated to shorter range wireless communications such as Wi-Fi and Bluetooth and a second communication package 506 may be dedicated to longer range wireless communications such as GPS, EDGE, GPRS, CDMA, WiMAX, LTE, Ev-DO, and others.

The cameras 532 including any depth sensors or proximity sensor are coupled to an optional image processor 536 to perform conversions, analysis, noise reduction, comparisons, depth or distance analysis, image understanding, and other processes as described herein. The processor 504 is coupled to the image processor to drive the process with interrupts, set parameters, and control operations of image processor and the cameras. Image processing may instead be performed in the processor 504, the graphics CPU 512, the cameras 532, or in any other device.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 500 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

FIG. 6 illustrates an embodiment of a computing environment 600 capable of supporting the operations discussed above. The modules and systems can be implemented in a variety of different hardware architectures and form factors including that shown in FIG. 5.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition Module 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition Module 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition Module 622. Various views of an application on one or more screens can be associated with alternative gesture libraries or a set of gesture templates for a given view. As an example, in FIG. 1A, a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual objects across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers.

The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition Module 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 601, 602, 603, 604, 605. 606, 607, and 608 are connected via an interconnect or a bus, such as bus 609.

Figure 7:
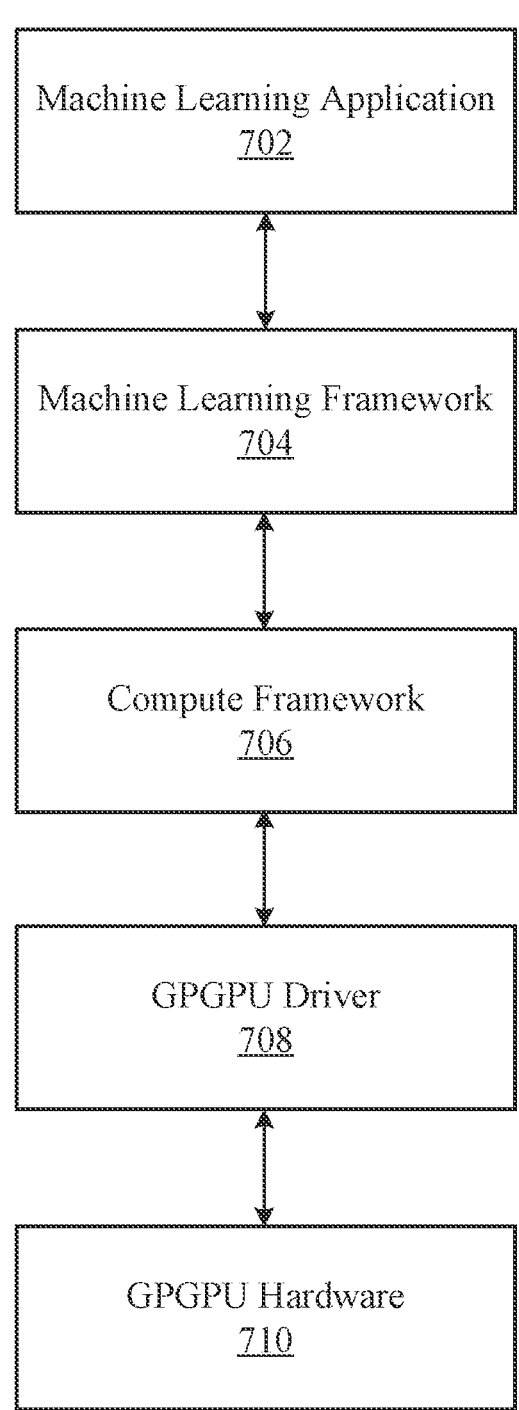
FIG. 7 illustrates a machine learning software stack according to one embodiment.

FIG. 7 is a generalized diagram of a machine learning software stack 700. Although FIG. 7 illustrates a software stack for general-purpose GPU (GPGPU) operations, a machine learning software stack is not limited to this example and may include, for also, a machine learning software stack for CPU operations. A machine learning application 702 can be configured to train a neural network using a training dataset or to use a trained deep neural network to implement machine intelligence. The machine learning application 702 can include training and inference functionality for a neural network and/or specialized software that can be used to train a neural network before deployment. The machine learning application 702 can implement any type of machine intelligence including but not limited to image recognition, mapping and localization, autonomous navigation, speech synthesis, medical imaging, or language translation.

Hardware acceleration for the machine learning application 702 can be enabled via a machine learning framework 704. The machine learning framework 704 can provide a library of machine learning primitives. Machine learning primitives are basic operations that are commonly performed by machine learning algorithms. Without the machine learning framework 704, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 704. Exemplary primitives include tensor convolutions, activation functions, and pooling, which are computational operations that are performed while training a convolutional neural network (CNN). The machine learning framework 704 can also provide primitives to implement basic linear algebra subprograms performed by many machine-learning algorithms, such as matrix and vector operations.

The machine learning framework 704 can process input data received from the machine learning application 702 and generate the appropriate input to a compute framework 706. The compute framework 706 can abstract the underlying instructions provided to the GPGPU driver 708 to enable the machine learning framework 704 to take advantage of hardware acceleration via the GPGPU hardware 710 without requiring the machine learning framework 704 to have intimate knowledge of the architecture of the GPGPU hardware 710. Additionally, the compute framework 706 can enable hardware acceleration for the machine learning framework 704 across a variety of types and generations of the GPGPU hardware 710.

Machine Learning Neural Network Implementations

The computing architecture provided by embodiments described herein can be trained and learn to perform the types of parallel processing that are computationally equivalent to training and deploying neural networks for machine learning. The computing architecture provided by embodiments described herein differs from Deep Neural Networks (DNNs), Convolutional Neural Networks or Recurrent Neural Networks (RNNs) with respect to both the functionality types of neurons deployed and with respect to the computation steps which the training process comprises. Even though the computing architecture provided differs from neural networks such as CNNs, DNNs or RNNs, some of the computations performed by this architecture may be equivalent to the computations performed by neural networks such as CNNs, DNNs or RNNs. Other computations performed by the computing architecture provided may not be possible if attempted by neural networks such as CNNs, DNNs or RNNs. This is the reason why the computing architecture provided by embodiments described herein addresses the robustness and precision issues associated with neural networks such as CNNs, DNNs or RNNs. A neural network can be generalized as a network of functions having a graph relationship. As is known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described below present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 8A:
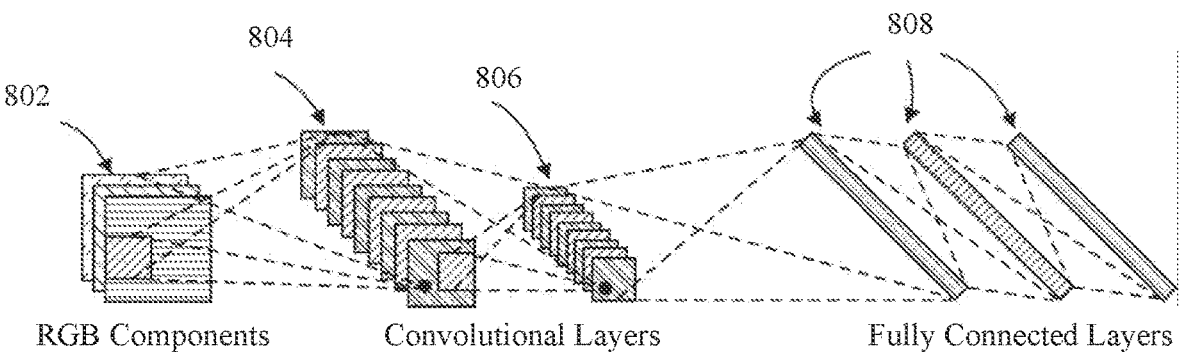
FIG. 8A illustrates neural network layers according to one embodiment.
Figure 8B:
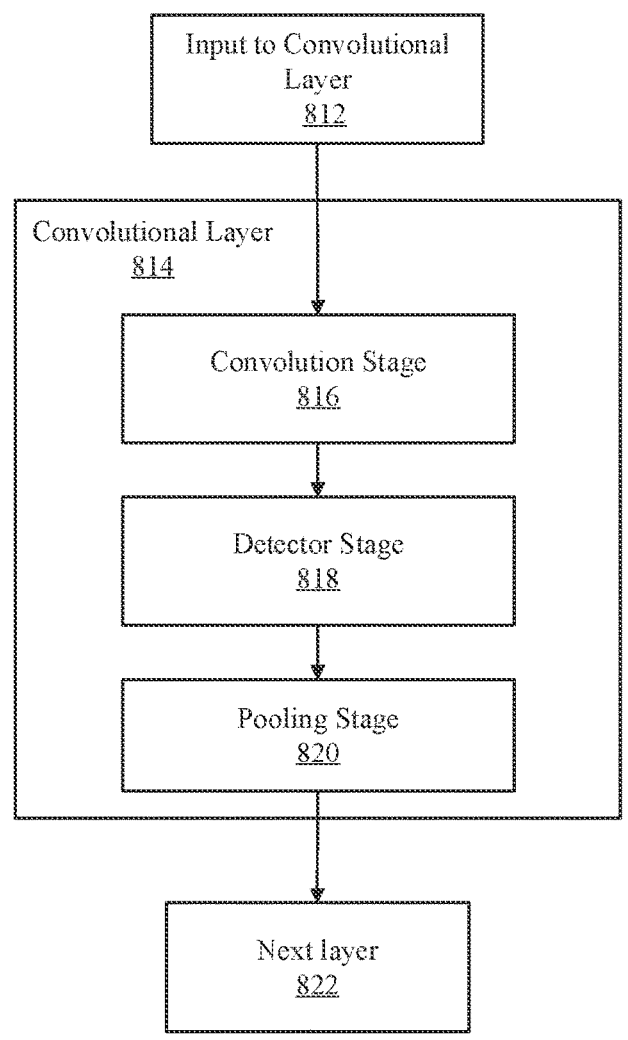
FIG. 8B illustrates computation stages associated with neural network layers according to one embodiment.

FIGS. 8A-8B illustrate an exemplary convolutional neural network. FIG. 8A illustrates various layers within a CNN. As shown in FIG. 8A, an exemplary CNN used to model image processing can receive input 802 describing the red, green, and blue (RGB) components of an input image. The input 802 can be processed by multiple convolutional layers (e.g., first convolutional layer 804, second convolutional layer 806). The output from the multiple convolutional layers may optionally be processed by a set of fully connected layers 808. Neurons in a fully connected layer have full connections to all activations in the previous layer, as previously described for a feedforward network. The output from the fully connected layers 808 can be used to generate an output result from the network. The activations within the fully connected layers 808 can be computed using matrix multiplication instead of convolution. Not all CNN implementations are make use of fully connected layers 808. For example, in some implementations the second convolutional layer 806 can generate output for the CNN.

The convolutional layers are sparsely connected, which differs from traditional neural network configuration found in the fully connected layers 808. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 8B illustrates exemplary computation stages within a convolutional layer of a CNN. Input to a convolutional layer 812 of a CNN can be processed in three stages of a convolutional layer 814. The three stages can include a convolution stage 816, a detector stage 818, and a pooling stage 820. The convolution layer 814 can then output data to a successive convolutional layer. The final convolutional layer of the network can generate output feature map data or provide input to a fully connected layer, for example, to generate a classification value for the input to the CNN.

In the convolution stage 816 performs several convolutions in parallel to produce a set of linear activations. The convolution stage 816 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 816 defines a set of linear activations that are processed by successive stages of the convolutional layer 814.

The linear activations can be processed by a detector stage 818. In the detector stage 818, each linear activation is processed by a non-linear activation function. The non-linear activation function increases the nonlinear properties of the overall network without affecting the receptive fields of the convolution layer. Several types of non-linear activation functions may be used. One particular type is the rectified linear unit (ReLU), which uses an activation function defined as $f(x)=max(0, x)$, such that the activation is thresholded at zero.

The pooling stage 820 uses a pooling function that replaces the output of the second convolutional layer 806 with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage 820, including max pooling, average pooling, and l2-norm pooling. Additionally, some CNN implementations do not include a pooling stage. Instead, such implementations substitute and additional convolution stage having an increased stride relative to previous convolution stages.

The output from the convolutional layer 814 can then be processed by the next layer 822. The next layer 822 can be an additional convolutional layer or one of the fully connected layers 808. For example, the first convolutional layer 804 of FIG. 8A can output to the second convolutional layer 806, while the second convolutional layer can output to a first layer of the fully connected layers 808.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate depth and motion estimations in machine learning environments, the apparatus comprising: one or more processors to: receive a frame associated with a scene captured by one or more cameras of a computing device; process the frame using a deep recurrent neural network architecture, wherein processing includes simultaneously predicating values associated with multiple loss functions corresponding to the frame; and estimate depth and motion based the predicted values.

Example 2 includes the subject matter of Example 1, wherein the simultaneously predicted values comprise two or more of pixel depth, pixel velocity, pixel class and segmentation, and pixel optical flow.

Example 3 includes the subject matter of Examples 1-2, wherein the deep recurrent neural network architecture is further to receive and process one or more of one or more previous frames for convolutional long short-term memory (LSTM) and odometry-based translation length, wherein the deep recurrent neural network architecture includes one or more of a deep recurrent neural network and one or more convolutional LSTM layers.

Example 4 includes the subject matter of Examples 1-3, wherein the one or more processors are further to fuse together the multiple loss functions associated with the simultaneously predicted values in a cumulated cost function, wherein fusing is performed using the deep recurrent neural network architecture.

Example 5 includes the subject matter of Examples 1-4, wherein the one or more processors are further to estimate, based on the deep recurrent neural network architecture, rotation matrixes and translation vectors for an object in the scene and each of the one or more cameras, wherein rotation matrixes and the translation vectors are fused together in a supervised form.

Example 6 includes the subject matter of Examples 1-5, wherein the one or more processors are further to constrain, based on odometry information, one or more of the rotation matrixes, translation vectors, and the simultaneously predicted values to estimate the depth of the scene and the motion of the one or more cameras.

Example 7 includes the subject matter of Examples 1-6, wherein the computing device comprises one or more processors comprising one or more of a graphics processor and an application processor, wherein the one or more processors are co-located on a common semiconductor package.

Some embodiments pertain to Example 8 that includes a method facilitating depth and motion estimations in machine learning environments, the method comprising: receiving a frame associated with a scene captured by one or more cameras of a computing device; processing the frame using a deep recurrent neural network architecture, wherein processing includes simultaneously predicating values associated with multiple loss functions corresponding to the frame; and estimating depth and motion based the predicted values.

Example 9 includes the subject matter of Example 8, wherein the simultaneously predicted values comprise two or more of pixel depth, pixel velocity, pixel class and segmentation, and pixel optical flow.

Example 10 includes the subject matter of Examples 8-9, wherein the deep recurrent neural network architecture is further to receive and process one or more of one or more previous frames for convolutional long short-term memory (LSTM) and odometry-based translation length, wherein the deep recurrent neural network architecture includes one or more of a deep recurrent neural network and one or more convolutional LSTM layers.

Example 11 includes the subject matter of Examples 8-10, further comprising fusing together the multiple loss functions associated with the simultaneously predicted values in a cumulated cost function, wherein fusing is performed using the deep recurrent neural network architecture.

Example 12 includes the subject matter of Examples 8-11, further comprising estimating, based on the deep recurrent neural network architecture, rotation matrixes and translation vectors for an object in the scene and each of the one or more cameras, wherein rotation matrixes and the translation vectors are fused together in a supervised form.

Example 13 includes the subject matter of Examples 8-12, further comprising constraining, based on odometry information, one or more of the rotation matrixes, translation vectors, and the simultaneously predicted values to estimate the depth of the scene and the motion of the one or more cameras, Example 14 includes the subject matter of Examples 8-13, wherein the computing device comprises one or more processors comprising one or more of a graphics processor and an application processor, wherein the one or more processors are co-located on a common semiconductor package.

Some embodiments pertain to Example 15 that includes a data processing system comprising one or more processing devices to: receive a frame associated with a scene captured by one or more cameras; process the frame using a deep recurrent neural network architecture, wherein processing includes simultaneously predicating values associated with multiple loss functions corresponding to the frame; and estimate depth and motion based the predicted values; and a memory coupled to the one or more processing devices.

Example 16 includes the subject matter of Example 15, wherein the simultaneously predicted values comprise two or more of pixel depth, pixel velocity, pixel class and segmentation, and pixel optical flow.

Example 17 includes the subject matter of Examples 15-16, wherein the deep recurrent neural network architecture is further to receive and process one or more of one or more previous frames for convolutional long short-term memory (LSTM) and odometry-based translation length, wherein the deep recurrent neural network architecture includes one or more of a deep recurrent neural network and one or more convolutional LSTM layers.

Example 18 includes the subject matter of Examples 15-17, wherein the one or more processing devices are further to fuse together the multiple loss functions associated with the simultaneously predicted values in a cumulated cost function, wherein fusing is performed using the deep recurrent neural network architecture.

Example 19 includes the subject matter of Examples 15-18, wherein the one or more processing devices are further to estimate, based on the deep recurrent neural network architecture, rotation matrixes and translation vectors for an object in the scene and each of the one or more cameras, wherein rotation matrixes and the translation vectors are fused together in a supervised form.

Example 20 includes the subject matter of Examples 15-19, wherein the one or more processing devices are further to constrain, based on odometry information, one or more of the rotation matrixes, translation vectors, and the simultaneously predicted values to estimate the depth of the scene and the motion of the one or more cameras.

Example 21 includes the subject matter of Examples 15-20, wherein the one or more processing devices comprise one or more of a graphics processor and an application processor, wherein the graphics and application processors are co-located on a common semiconductor package.

Some embodiments pertain to Example 22 that includes an apparatus facilitating depth and motion estimation in machine learning environments, the apparatus comprising: means for receiving a frame associated with a scene captured by one or more cameras of the apparatus; means for processing the frame using a deep recurrent neural network architecture, wherein processing includes simultaneously predicating values associated with multiple loss functions corresponding to the frame; and means for estimating depth and motion based the predicted values.

Example 23 includes the subject matter of Example 22, wherein the simultaneously predicted values comprise two or more of pixel depth, pixel velocity, pixel class and segmentation, and pixel optical flow.

Example 24 includes the subject matter of Examples 22-23, wherein the deep recurrent neural network architecture is further to receive and process one or more of one or more previous frames for convolutional long short-term memory (LSTM) and odometry-based translation length, wherein the deep recurrent neural network architecture includes one or more of a deep recurrent neural network and one or more convolutional LSTM layers.

Example 25 includes the subject matter of Examples 22-24, further comprising means for fusing together the multiple loss functions associated with the simultaneously predicted values in a cumulated cost function, wherein fusing is performed using the deep recurrent neural network architecture.

Example 26 includes the subject matter of Examples 22-25, further comprising means for estimating, based on the deep recurrent neural network architecture, rotation matrixes and translation vectors for an object in the scene and each of the one or more cameras, wherein rotation matrixes and the translation vectors are fused together in a supervised form.

Example 27 includes the subject matter of Examples 22-26, further comprising means for constraining, based on odometry information, one or more of the rotation matrixes, translation vectors, and the simultaneously predicted values to estimate the depth of the scene and the motion of the one or more cameras.

Example 28 includes the subject matter of Examples 22-27, wherein the apparatus comprises one or more processors comprising one or more of a graphics processor and an application processor, wherein the one or more processors are co-located on a common semiconductor package.

Example 29 includes at least one non-transitory or tangible machine-readable medium comprising a plurality of instructions, when executed on a computing device, to implement or perform a method as claimed in any of claims or examples 8-14.

Example 30 includes at least one machine-readable medium comprising a plurality of instructions, when executed on a computing device, to implement or perform a method as claimed in any of claims or examples 8-14.

Example 31 includes a system comprising a mechanism to implement or perform a method as claimed in any of claims or examples 8-14.

Example 32 includes an apparatus comprising means for performing a method as claimed in any of claims or examples 8-14.

Example 33 includes a computing device arranged to implement or perform a method as claimed in any of claims or examples 8-14.

Example 34 includes a communications device arranged to implement or perform a method as claimed in any of claims or examples 8-14.

Example 35 includes at least one machine-readable medium comprising a plurality of instructions, when executed on a computing device, to implement or perform a method or realize an apparatus as claimed in any preceding claims.

Example 36 includes at least one non-transitory or tangible machine-readable medium comprising a plurality of instructions, when executed on a computing device, to implement or perform a method or realize an apparatus as claimed in any preceding claims.

Example 37 includes a system comprising a mechanism to implement or perform a method or realize an apparatus as claimed in any preceding claims.

Example 38 includes an apparatus comprising means to perform a method as claimed in any preceding claims.

Example 39 includes a computing device arranged to implement or perform a method or realize an apparatus as claimed in any preceding claims.

Example 40 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. At least one non-transitory computer-readable medium comprising instructions which, when executed, cause a computing device to perform operations comprising:
  predicating values relating to a frame associated with a scene;
  receiving the frame such that the values are associated with multiple loss functions corresponding to the frame, wherein the values are simultaneously predicted and comprise two or more of pixel depth, pixel velocity, pixel class and segmentation, or pixel optical flow; and
  estimating one or more of depth or motion based on the predicted values.

2. The non-transitory computer-readable medium of claim 1, wherein the operations further comprise receiving and processing, by a neural network architecture, one or more of one or more previous frames for convolutional long short-term memory (LSTM) and odometry-based translation length, wherein the neural network architecture comprises a deep recurrent neural network architecture based on one or more deep recurrent neural networks or one or more convolutional LSTM layers.

3. The non-transitory computer-readable medium of claim 1, wherein the operations further comprise fusing together the multiple loss functions associated with the simultaneously predicted values in a cumulated cost function.

4. The non-transitory computer-readable medium of claim 1, wherein the operations further comprise estimating rotation matrixes and translation vectors for an object in the scene or one or more cameras capturing of the scene, wherein rotation matrixes and the translation vectors are fused together in a supervised form.

5. The non-transitory computer-readable medium of claim 4, wherein the operations further comprise constraining, based on odometry information, one or more of the rotation matrixes, translation vectors, and the simultaneously predicted values to estimate the depth of the scene and the motion of the one or more cameras, wherein the computing device comprises processing circuitry having one or more of graphics processing circuitry or application processing circuitry.

6. A method comprising:
  predicating, by processing circuitry of a computing device, values relating to a frame associated with a scene;
  receiving the frame such that the values are associated with multiple loss functions corresponding to the frame, wherein the values are simultaneously predicted and comprise two or more of pixel depth, pixel velocity, pixel class and segmentation, or pixel optical flow; and estimating one or more of depth or motion based on the predicted values.

7. The method of claim 6, further comprising receiving and processing, by a neural network architecture, one or more of one or more previous frames for convolutional long short-term memory (LSTM) and odometry-based translation length, wherein the neural network architecture comprises a deep recurrent neural network architecture based on one or more deep recurrent neural networks or one or more convolutional LSTM layers.

8. The method of claim 6, further comprising fusing together the multiple loss functions associated with the simultaneously predicted values in a cumulated cost function.

9. The method of claim 6, further comprising estimating rotation matrixes and translation vectors for an object in the scene or one or more cameras capturing of the scene, wherein rotation matrixes and the translation vectors are fused together in a supervised form.

10. The method of claim 9, further comprising constraining, based on odometry information, one or more of the rotation matrixes, translation vectors, and the simultaneously predicted values to estimate the depth of the scene and the motion of the one or more cameras, wherein the one or more cameras are coupled to the processing circuitry having one or more of graphics processing circuitry or application processing circuitry.

11. An apparatus comprising:

processing circuitry to:

predict values relating to a frame associated with a scene; and receive the frame such that the values are associated with multiple loss functions corresponding to the frame, wherein the values are simultaneously predicted and comprise two or more of pixel depth, pixel velocity, pixel class and segmentation, or pixel optical flow; and estimate one or more of depth or motion based on the predicted values.

12. The apparatus of claim 11, wherein the processing circuitry is further to receive and process, via a neural network architecture, one or more of one or more previous frames for convolutional long short-term memory (LSTM) and odometry-based translation length, wherein the neural network architecture comprises a deep recurrent neural network architecture based on one or more deep recurrent neural networks or one or more convolutional LSTM layers.

13. The apparatus of claim 12, wherein the processing circuitry is further to estimate rotation matrixes and translation vectors for an object in the scene or one or more cameras capturing of the scene, wherein rotation matrixes and the translation vectors are fused together in a supervised form.

14. The apparatus of claim 13, wherein the processing circuitry is further to constrain, based on odometry information, one or more of the rotation matrixes, translation vectors, and the simultaneously predicted values to estimate the depth of the scene and the motion of the one or more cameras, wherein the one or more processors comprising one or more of a graphics processor or an application processor, wherein the one or more processors are co-located on a common semiconductor package.

15. The apparatus of claim 11, wherein the processing circuitry is further to fuse together the multiple loss functions associated with the simultaneously predicted values in a cumulated cost function.

* * * * *